Aug. 4, 1953     E. J. HIRVONEN     2,647,407
MACHINE TOOL SPINDLE CONSTRUCTION
Filed Oct. 7, 1950     2 Sheets-Sheet 1

INVENTOR.
Eric J. Hirvonen
BY
Charles R. Fay,
ATTORNEY

Aug. 4, 1953     E. J. HIRVONEN     2,647,407
MACHINE TOOL SPINDLE CONSTRUCTION
Filed Oct. 7, 1950     2 Sheets-Sheet 2
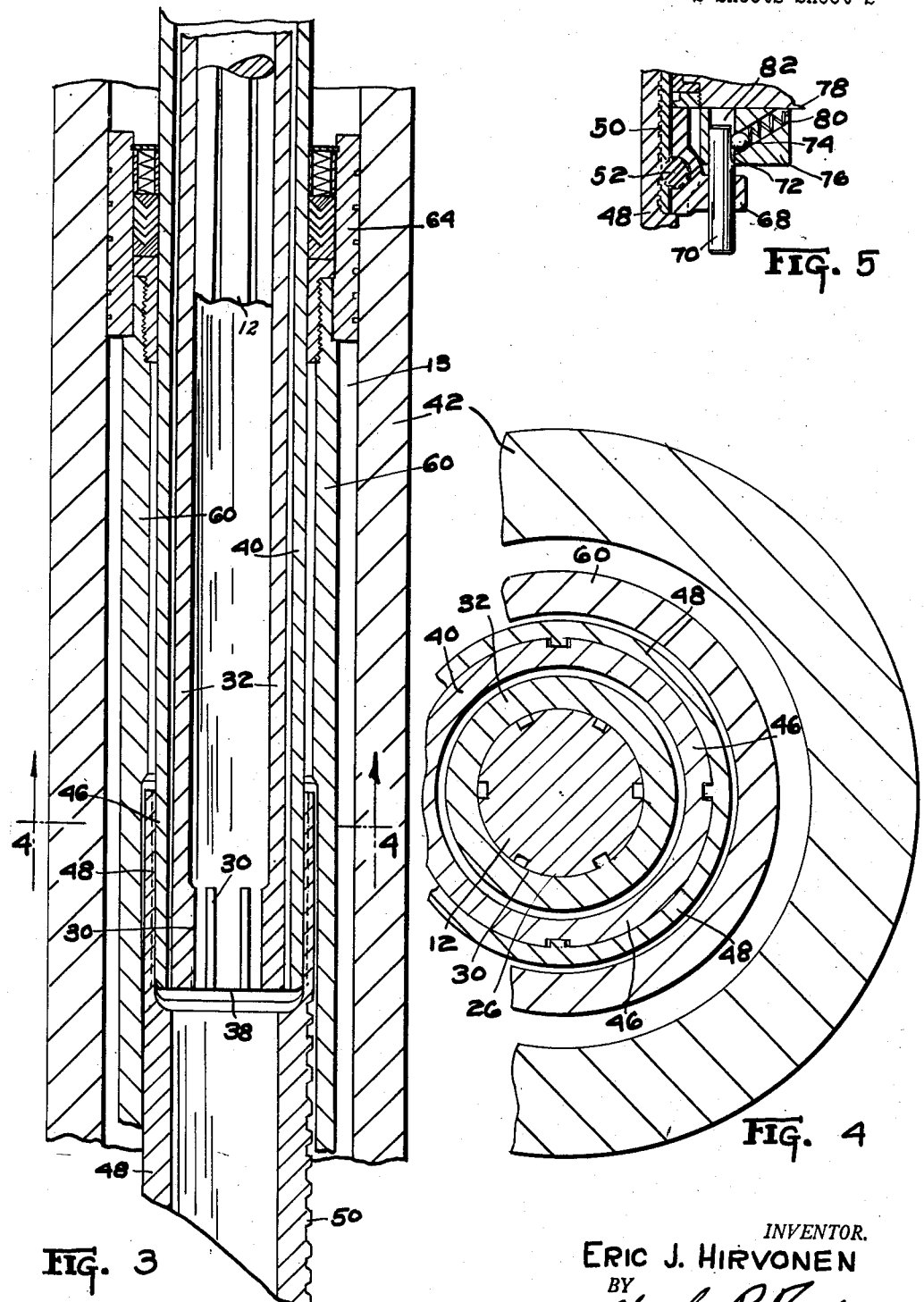
INVENTOR.
ERIC J. HIRVONEN
BY
*Charles R. Fay.*
ATTORNEY Patented Aug. 4, 1953

2,647,407

UNITED STATES PATENT OFFICE 2,647,407

MACHINE TOOL SPINDLE CONSTRUCTION

Eric J. Hirvonen, Shrewsbury, Mass., assignor to Leland-Gifford Company, Worcester, Mass., a corporation of Massachusetts Application October 7, 1950, Serial No. 189,002

8 Claims. (Cl. 74—22)

This invention relates in general to new and improved constructions for machine tool spindles and feed means therefor, having particular reference to those spindles which are fed or reciprocated by hydraulic power, and including driven spindles for drill presses.

The principal object of the present invention resides in the provision of a new and improved construction of the class described which is easily adaptable to hydraulic feed for rapid advance, feed, rapid retraction and stop and which although taking little space in the machine is still positive in action, trouble-free, and sturdy in construction.

Another object of the invention resides in the provision of a device as above recited which is flexible in adjustment so that the range of reciprocation of the spindle may take place at any desired location within the limits of the machine, this adjustment embodying a new and improved construction.

A still further object of the invention resides in the provision of a new and improved safety locking means for the spindle, and including a construction whereby the spindle automatically becomes locked at one extreme limit thereof not usually within the ordinary range of reciprocation; the lock or latching means whereby this result is obtained being such as to require force to overcome, i. e., to unlock the spindle and allow it to again come into action, the locking action being easy and requiring little force, the unlocking action being difficult and requiring considerable force.

Other objects and advantages of the invention will appear hereinafter.

Reference is to be had to the accompanying drawings in which

Fig. 3 is an enlarged sectional view through the spindle;

Fig. 4 is an enlarged section on line 4—4 of Fig. 3; and

Fig. 5 is a section through the locking means.

Figures 1, 2:
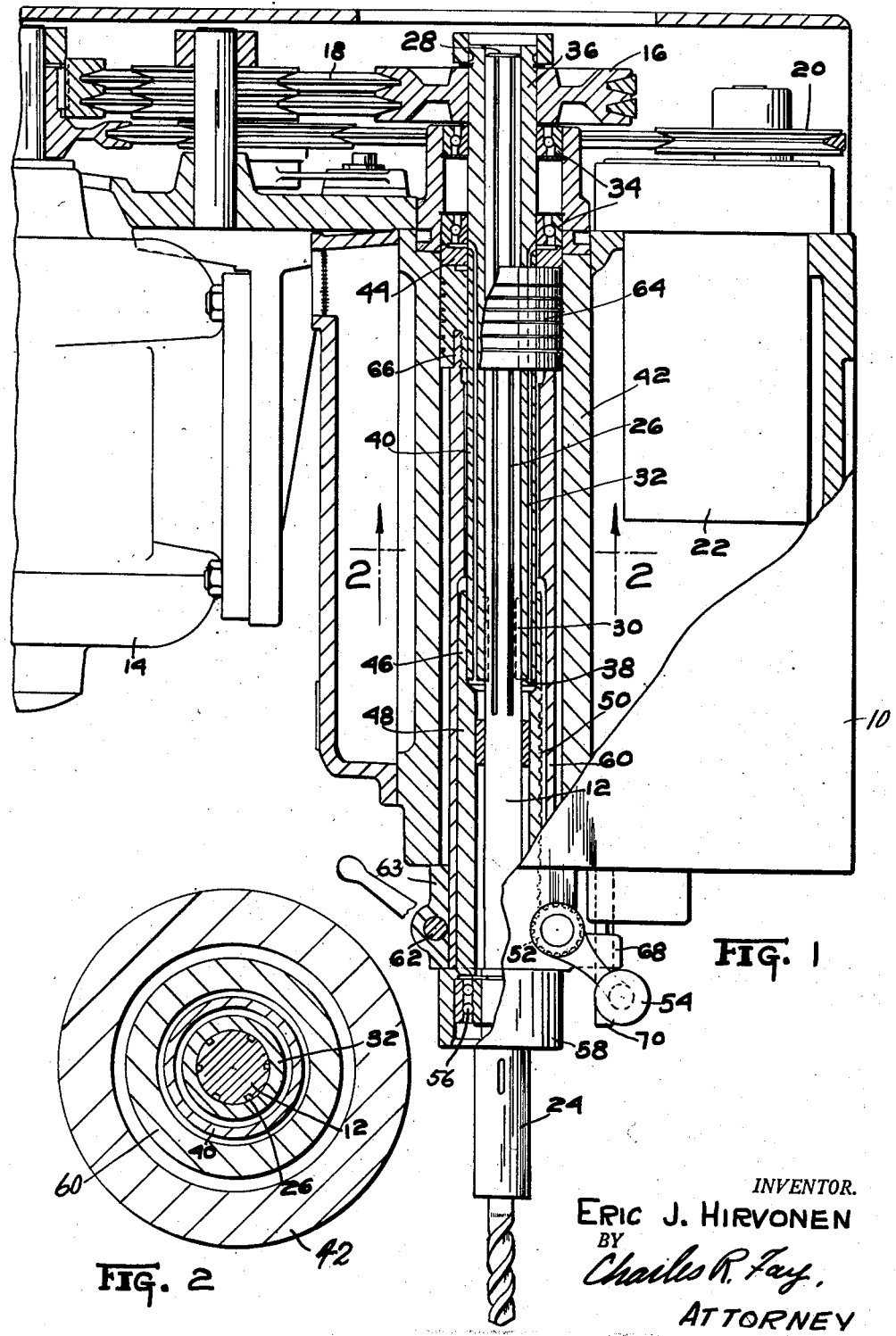
Fig. 1 is a view partly in section through a drill spindle illustrating the present invention.
Fig. 2 is an enlarged section on lines 2—2 of Fig. 1.

This invention is herein illustrated as applied to a hydraulic drilling machine but it is not limited to such use or to this machine, and the invention is capable of use wherever needed or desired but particularly in the field of machine tool feeds.

A main housing is illustrated in part at 10 and this housing is normally mounted on a standard as will be clear to those skilled in the art. The housing 10 supports all of the mechanism described herein and it is seen that the drill spindle 12 herein as shown vertical, but, of course, it is understood that it may be horizontal or at any angle.

The housing 10 supports a motor 14 for the purpose of rotating the spindle and this motor may be supported in any way desired. Motor 14 drives a pulley 16 through the intermediary of belts 18 in the usual manner. This motor also drives a pulley 20 which is used to operate a pump generally indicated at 22 for providing the hydraulic power required for reciprocating the spindle during its fast travel, feed, reverse, etc. The spindle 12 is elongated and as shown in Fig. 1 it is at its uppermost position, i. e., fully retracted. The spindle 12 has a chuck 24 at its lower end, and the greater length thereof is provided with splines 26 which continue on to the upper end of the spindle indicated at 28.

These splines 26 longitudinally engage complementary interior keyways or the like at 30 in a sleeve 32 which extends upwardly to bearings 34 whereby it is held rotatably but is prevented against axial movement. The sleeve 32 continues upwardly at 36 where it is provided with the pulley 16 so that it is seen the spindle is rotated by the sleeve 32 and yet is axially adjustable in and out or up and down relative thereto. Sleeve 32 terminates at 38 which is the lowermost point thereof.

A sleeve 40 surrounds sleeve 32, the exterior surface of sleeve 40 forming the interior wall of an annular cylinder, the outer wall of which is provided by the inside surface of the relatively large fixed outermost sleeve 42. This cylinder will be described more fully hereinafter.

The sleeve 40 depends from adjacent bearings 34 and is held by a head or stud 44. This sleeve cannot rotate nor can it reciprocate and is held fixed by the member 44. At its lower end sleeve 40 is provided with exterior splines as at 46 so as to hold non-rotatably but axially sliding thereto a sleeve 48, the latter having a rack 50 for adjustable engagement by a pinion 52 rotatable by a hand crank 54. The sleeve 48 carries the bearing housing or head 58 thereon at the lower end thereof and thus it is seen that the head is adjustable for the length of splines 46 relative to the driving sleeve 32.

The sleeve 48 is non-rotatable but mounts a bearing rotatably supporting the spindle 12 adjacent the lower portion thereof. The spindle 12 and the bearing housing or head 58 are adjustable with sleeve 48 but relative to an exterior sleeve 60 which, however, reciprocates the spindle being normally clamped to sleeve 48 by a split collar clamping device 62 on a head 63.

Sleeve 60 is secured to a piston 64 as at 66 and this piston, of course, reciprocates under the influence of the hydraulic pump according to a valve and control system not herein illustrated. As clearly shown in Figs. 1 and 3 the cylinder wall is on the interior of sleeve 42 but the cylinder itself is annular and the inner wall is on sleeve 40, the spindle and driving sleeve 32 being contained centrally thereof.

The head 62 is provided with a boss 68 on which is mounted a post 70, said post having a notch 72 cooperating with a ball 74 in a housing 76 and backed up by a spring 78 in a channel 80. Said channel is at a particular angle by means of which the post easily forces the ball 74 reversely in channel 80 on the up stroke of the spindle, but once the ball has been pushed aside and drops back into notch 72, the entire weight of the spindle and associated parts is easily held. This device requires considerable force exerted downwardly, to cause the ball to retract to release the post and become unlocked. In other words, the ball is easily forced backwardly in its channel by an upward thrust of post 70 in the bore 82, but it is not easily thrust back in the channel by a downward thrust once the ball is seated in notch 72.

Having thus described my invention and the advantages thereof, I do not wish to be limited to the details herein disclosed otherwise than as set forth in the claims, but what I claim is:

1. Apparatus of the class described comprising a spindle, a rotary sleeve therefor, means fixing the spindle to the sleeve against relative rotation thereof but providing for relative axial movement of the spindle, means to reciprocate the spindle in the sleeve including a second sleeve, a piston thereon, and means forming a cylinder for the piston, the second sleeve being exterior the first sleeve and connected to the spindle at a point past an end of the first sleeve, means rotating the latter and therefore the spindle, means to axially adjust the spindle relative to the first and second sleeves, and means to prevent rotation of the adjustable means.

2. Apparatus of the class described comprising a spindle, a rotary sleeve therefor, means fixing the spindle to the sleeve against relative rotation there of but providing for relative axial movement of the spindle, means to reciprocate the spindle in the sleeve including a second sleeve, a piston thereon, and means forming a cylinder for the piston, the second sleeve being exterior the first sleeve and connected to the spindle at a point past an end of the first sleeve, means rotating the latter and therefore the spindle, means to axially adjust the spindle relative to the first and second sleeves and means to prevent rotation of the adjusting means, said rotation preventing means comprising a fixed sleeve embracing the first named sleeve and splined to the adjusting means.

3. Apparatus of the class described comprising a spindle, a rotary sleeve therefor, means fixing the spindle to the sleeve against relative rotation thereof but providing for relative axial movement of the spindle, means to reciprocate the spindle in the sleeve including a second sleeve, a piston thereon, and means forming a cylinder for the piston, the second sleeve being exterior the first sleeve and connected to the spindle at a point past an end of the first sleeve, means rotating the latter and therefore the spindle, means to axially adjust the spindle relative to the first and second sleeves, and means to prevent rotation of the adjusting means, said last two means comprising a fixed sleeve and a slidable sleeve splined together, means to axially move the slidable sleeve and a bearing connection between the latter and the spindle.

4. Apparatus of the class described comprising a rotary and axially reciprocable spindle, a sleeve splined thereto to rotate the same, a second sleeve and a piston thereon, a third sleeve connected to the spindle for relative rotation but being axially fixed thereto, a sleeve to prevent rotation of the third sleeve, means to axially adjust the latter and the spindle therewith, a cylinder for the piston, the latter being annular and having an inside bearing surface on one of said sleeves.

5. Apparatus of the class described comprising a rotary and axially reciprocable spindle, a sleeve splined thereto to rotate the same, a second sleeve and a piston thereon, a third sleeve connected to the spindle for relative rotation but being axially fixed thereto, a sleeve to prevent rotation of the third sleeve, means to axially adjust the latter and the spindle therewith, a cylinder for the piston, the latter being annular and having an inside bearing surface on one of said sleeves, the third and fourth sleeves being splined together for relative axial sliding and the fourth sleeve being fixed.

6. Apparatus of the class described comprising a rotary and axially reciprocable spindle, a sleeve splined thereto to rotate the same, a second sleeve and a piston thereon, a third sleeve connected to the spindle for relative rotation but being axially fixed thereto, a sleeve to prevent rotation of the third sleeve, means to axially adjust the latter and the spindle therewith, a cylinder for the piston, the latter being annular and having an inside bearing surface on one of said sleeves, the third and fourth sleeves being splined together for relative axial sliding and the fourth sleeve being fixed and extending about the first sleeve and within the second sleeve.

7. Apparatus of the class described comprising a rotary and axially reciprocable spindle, a sleeve splined thereto to rotate the same, a second sleeve and a piston thereon, a third sleeve connected to the spindle for relative rotation but being axially fixed thereto, a sleeve to prevent rotation of the third sleeve, means to axially adjust the latter and the spindle therewith, a cylinder for the piston, the latter being annular and having an inside bearing surface on one of said sleeves, the third and fourth sleeves being splined together for relative axial sliding and the fourth sleeve being fixed and extending about the first sleeve and within the second sleeve, and affording an inside cylinder wall for the piston, the latter being annular.

8. Cylinder and piston construction for a spindle comprising a fixed sleeve, an annular piston thereabout and reciprocable thereon, a sleeve attached to the piston for reciprocation thereby, a cylinder for the piston, a spindle head, said piston attached sleeve being secured thereto for reciprocation thereof, a third sleeve axially adjustable relative to the piston-attached sleeve and non-axially movable relative to the spindle, and means to adjust the third sleeve and spindle axially.

ERIC J. HIRVONEN.

References Cited in the file of this patent

UNITED STATES PATENTS

| Number | Name | Date |
| --- | --- | --- |
| 298,224 | Morgan | May 6, 1884 |
| 778,168 | Bramwell | Dec. 20, 1904 |
| 1,552,768 | Smith | Sept. 8, 1925 |
| 1,727,984 | Johnson | Sept. 10, 1929 |
| 1,911,821 | Gangler | May 30, 1933 |
| 2,374,764 | Matkys | May 1, 1945 |